Dec. 24, 1935.  H. SINGER  2,025,553
TEMPERATURE CONTROL DEVICE
Filed June 23, 1933
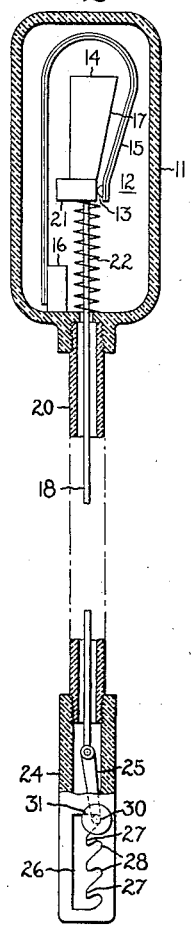
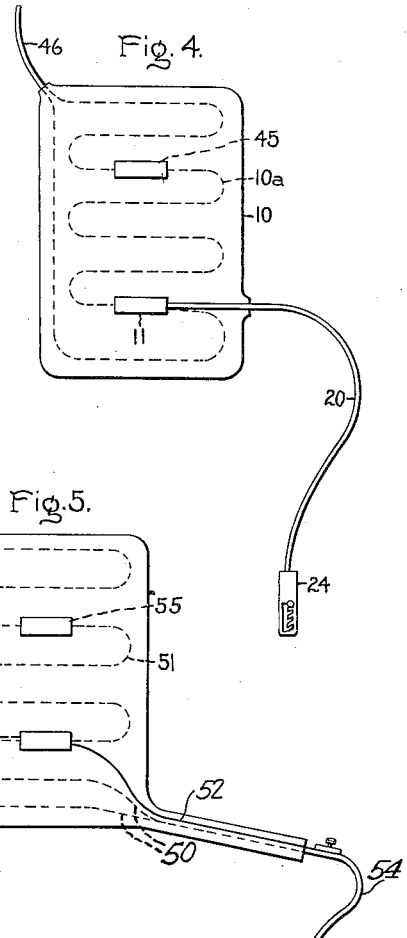
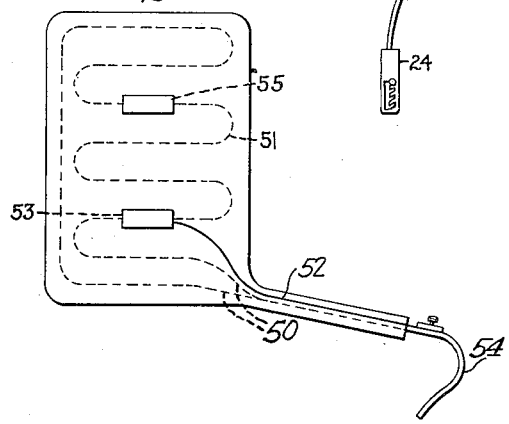
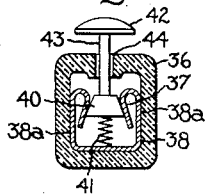
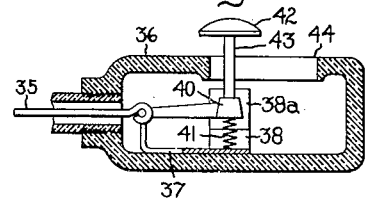
Inventor:
Hanns Singer,
by Harry E. Dunham
His Attorney.

Patented Dec. 24, 1935

2,025,553

UNITED STATES PATENT OFFICE 2,025,553

TEMPERATURE CONTROL DEVICE

Hanns Singer, Berlin-Steglitz, Germany, assignor to General Electric Company, a corporation of New York Application June 23, 1933, Serial No. 677,223
In Germany September 15, 1932

6 Claims. (Cl. 200—138)

This invention relates to temperature control devices and it has for its object the provision of improved temperature control means for electric heating pads and the like.

Heretofore, in certain heating pads, the regulation of temperature has been effected by providing the pad with several heating elements or windings arranged to be connected in several different heating circuits by means of a switch so as to provide different pad operating temperatures. This arrangement possesses the disadvantage that a rather large number of conductors must be directed from the pad and moreover, the number of adjustable temperature steps is somewhat limited.

It has also been suggested that several thermostats having different temperature settings be provided in the pad arranged to selectively control the heating circuit of the pad to maintain different temperatures. In this arrangement, the number of temperature steps possible is limited to the number of thermostats provided.

In accordance with this invention the temperature control device is so arranged that but a single thermostat is necessary for controlling the heating circuit of the pad to provide for a large number of operating temperatures within fairly wide temperature limits. Suitable control means accessible on the exterior of the pad is provided whereby the temperature setting of the thermostat can be conveniently adjusted.

In one form of the invention, a bi-metallic thermostat bar is provided in the pad to control its heating circuit. A wedge-shaped member in the pad is arranged to engage the bar so as to adjust its position and thereby its temperature setting. The wedge-shaped member is operated by a rod which projects from the pad so as to be accessible on the exterior of the pad. Preferably, the wedge-shaped member will be biased in one direction by means of a spring and will be moved in the opposite direction against the bias of the spring by means of the rod. Means are provided on the exterior of the pad for locking the rod in various controlling positions. The wedge member may be and preferably will constitute or carry one of the switch contacts in the heating circuit.

For a more complete understanding of the invention reference should be had to the accompanying drawing in which Fig. 1 is a vertical elevation of a temperature control device embodying the invention, portions being shown in section so as to illustrate certain structural details and portions being broken away; Fig. 2 is a transverse sectional view of a modified form of certain locking means used in the device of Fig. 1; Fig. 3 is a longitudinal sectional view of the device shown in Fig. 2; Fig. 4 is a plan view of a heating pad provided with the temperature control device of Fig. 1; and Fig. 5 is a plan view of a heating pad of modified form embodying the temperature control device of Fig. 1.

Referring to Figs. 1 and 4, the invention is shown as applied to a heating pad comprising a heating body 10 (Fig. 4) and a heating resistance element 10a housed by the body 10. The energization of the heating element 10a is controlled by means of a suitable temperature control device which comprises a casing 11 housing a switch 12. The switch 12 comprises a contact 13 and a cooperating contact 14. It will be understood that the contacts 13 and 14 will be connected in the energizing circuit of the heating element 10a so that when the contacts are engaged the heating element will be energized, whereas when the contacts are separated the heating element will be deenergized.

The switch 12 is controlled by means of a suitable thermostat, shown as a bimetallic bar 15, made of two strips of metal having dissimilar temperature coefficients such as invar and Monel metal, these two strips being securely welded or brazed together lengthwise. The thermostat bar 15, as shown, is rigidly secured at one end to a support 16 mounted in the casing 11, while the other end portion of the bar is given a substantially horseshoe shape. This end of the bar, it will be understood, is free to move laterally in response to temperature changes.

This free end of the thermostat bar 15 carries the switch contact 13. The contact 14 is arranged to be moved relative to the contact 13 and, as shown, is provided with an inclined surface 17 which bears on the contact 13, whereby when the contact 14 is moved longitudinally of the housing 11, the position of the contact 13 and hence the tension in the bimetallic bar 15 will be changed. This, of course, results in a change in the temperature setting of the bimetallic bar.

The position of the contact 14 is adjusted by means of a rod 18 which, as shown, projects from the casing 11, the projecting portion being encased by a suitable tubular member 20. This member 20, as shown, is secured to the housing 11. Interposed between the contact 14 and its operating rod 18 is a suitable block of insulating material 21 arranged to effectively insulate the operating rod from the switch. If desired the contact 14 may consist of a suitable electrically conducting strip, as shown in Fig. 1, carried by a wedge-shaped block which may be formed of insulating material, and preferably integrally with the insulating block 21. On the other hand, the contact 14 and the wedge may be formed of one piece of conducting material which is insulated from the rod 18 by the insulating block 21.

Preferably, both the rod 18 and its casing 20 will be formed of suitable flexible materials.

The contact 14 is biased inwardly of the casing 11, that is, in such a direction as to reduce the tension in the bimetallic bar 15 and hence, to reduce the temperature setting of the control device by means of a compression spring 22 interposed between the block of insulating material 21 and the adjacent end wall of the casing 11. It will be understood that the contact 14 will be moved in the other direction, that is, in a direction to increase the tension of the bimetallic bar 15 and hence its temperature setting, by means of the rod 18.

The rod 18 is arranged to be locked in various adjusting positions against the bias of the spring 22 by means of a suitable locking device comprising a housing 24 secured to the tubular member 20 and arranged to receive the projecting end of the operating rod 18. The end of the rod 18 within the housing 24 is provided with a locking lever 25 that is pivotally secured to the rod. In one wall of the housing is an elongated slot 26 having in one edge, as shown, a number of serrations or teeth 27, which form suitable rests 28 between them for a locking pin 30 carried by the locking lever 25. It will be readily observed by reference to Fig. 1 that by reason of this arrangement, the rod 18 may be moved to several adjusting positions, in each of which it can be locked by means of the pin 30 and teeth 27; thus, the rod 18 may be locked in either one of four positions, as shown in Fig. 1. The number of these adjusting positions, of course, can be either increased or decreased as desired. Carried by the pin 30 is a suitable operating knob 31 arranged on the exterior of the housing 24, whereby it can be conveniently grasped by the operator to move the rod 18 to the desired position and to move the pin 30 into the corresponding locking recess 28.

It will be understood that either the bimetallic bar 15 or the contact 13 carried thereby can be connected directly to one side of the heating circuit 11, whereas the contact 14 will be connected to the other side of the heating circuit.

It will also be understood that when the rod 18 is in the position shown in Fig. 1, the switch contact 13 will engage the insulating block 21 and hence, will interrupt the heating circuit. If the pin 30 be moved to its first rest 28, immediately below the position the pin 30 has in Fig. 1, the contact 13 will engage the contact 14 to complete the energizing circuit for the pad. In this position, the thermostat 15 will operate to maintain a relatively low temperature. To increase the temperature setting of the pad it is merely necessary to move the pin 30 to the next succeeding rest 28, while to further increase the temperature the pin 30 will be moved to the lowest rest 28. To decrease the temperature setting of the pad, the pin 30 will be released so as to allow the contact 14 to be moved in the reverse direction by means of the resilient member 22.

In Figs. 2 and 3 is illustrated a modified form of locking device for the rod 18 indicated by the numeral 35 in these figures. As shown in these figures, the rod 35 terminates in a housing 36 in which the locking device is mounted. The end of the rod received in the housing 36 is attached to a suitable plate 37 which carries on its end remote from the point of attachment with the rod 35 a resilient clamping member 38. This member 38 comprises a pair of shoes 38a resting against the adjacent side walls of the housing 36. These shoes, as shown in Fig. 2, are folded upon themselves in a substantially horseshoe shape, one leg of the horseshoe bearing on the adjacent wall of the housing 36. The plate 37 further carries a suitable wedge 40 arranged to engage the other legs of the shoes 38a, as shown in Fig. 2, so that when the wedge is elevated, as viewed in this figure, the shoes 38a are pressed outwardly against the adjacent walls of the housing so as to lock the plate 37 and the rod 35 attached to it in an adjusted position. The wedge 40 is moved upwardly to lock the shoes 38a by means of a suitable compression spring 41, and is depressed against the bias of the spring 41 to release the shoes 38a by means of a suitable push button 42 on the exterior of the housing and connected with the wedge by means of a rod 43. The housing is provided with an elongated slot 44 receiving the rod 43 so as to provide for longitudinal movement of the plate 37 within the housing.

By reason of this arrangement it will be observed that the temperature setting of the pad may be uniformly changed within rather wide limits. Thus, the rod 35 may be clamped in any one of a large number of adjusting positions within the range of movement of the plate 37.

The housing 11 of the temperature control device is enclosed by the pad 10 (Fig. 4) and its contacts 13 and 14 are connected in the heating circuit, while the tube 20 carrying the adjusting rod 18 protrudes from the pad so that it may be conveniently operated to effect adjustments of the thermostat bar 15. In this pad in addition to the adjustable temperature control device, a suitable temperature cut-out device 45 is provided in the heating circuit of the pad. This cut-out device is adjusted permanently to a certain maximum temperature and is provided merely as a safety device. As shown, the supply conductors 46 for the heating circuit are brought out from the pad at a point removed from the casing 20 for the adjustment rod.

In Fig. 5 the supply conductor 50 for the heating circuit 51 of the pad and the tubular member 52 housing the adjusting rod for the thermostat 53 is provided with a common conduit housing 54, rather than being brought out separately from the pad as are the casing 20 and conductors 46 of Fig. 4. The tubular member 52 and the thermostat 53 have the same construction as the corresponding elements of Fig. 1. Here again, an additional safety temperature cut-out device 55 may be provided in the heating circuit of the pad, if desired.

It will be understood that the body members of the pad shown in Figs. 4 and 5 may be formed of any suitable material. Thus, they may be formed of vulcanized rubber in which the heating circuits and thermostats respectively are embedded, or they may be formed of any suitable cloth covering.

If desired, the adjusting rod 18 may be provided with other suitable forms of locking means. Thus, for example, a suitable traveling nut may be provided in the housing 24 (Fig. 1) in which the outer end of the rod 18 is received. The screw will be operatively connected with the rod 18 and will be provided with an adjustable screw which will project from the housing whereby it can be turned. By turning the nut it will be understood that the rod 18 will be shifted so as to effect a change in the position of the associated switch contact.

What I claim as new and desire to secure by Letters Patent of the United States is:

1. In a heating pad and the like, a temperature control device comprising a thermostat, a housing for said thermostat, a movable member in said housing cooperating with said thermostat so as to change its position by movement of said member, a resilient member independent of said thermostat biasing said movable member in one direction, a rod-like member arranged to move said member against the biasing force of said resilient member and projecting from said casing whereby it is accessible on the exterior thereof and means on the exterior of said casing for locking said rod in each of a plurality of adjusting positions against the force of said resilient member.

2. In a heating pad and the like, a temperature control device for the heating circuit of said pad comprising a bimetallic thermostat bar arranged to control said heating circuit, a casing for said bar, a wedge-shaped element in said casing arranged to engage said bimetallic bar to move it to various positions in said casing, means independent of said thermostat biasing said wedge-shaped element in one direction, a control member accessible on the exterior of said casing for moving said wedge-shaped element in the opposite direction and means for locking said control member in each of a plurality of controlling positions against the force of said biasing means.

3. In a heating pad and the like, a temperature control device for controlling the heating circuit of said pad to maintain a predetermined temperature in said pad comprising a thermostat responsive to the temperature of said pad, a casing for said thermostat, switch contacts within said casing connected in said heating circuit and controlled by said thermostat, one contact carried by said thermostat and the second contact having an inclined surface bearing on said first contact and arranged for movement so that the positions of said first contact and said thermostat are varied by movement of said second contact, a spring biasing said second contact in one direction, an operating member connected to said second contact and projecting from said casing and said pad whereby it is accessible on the exterior thereof to move said second contact in the opposite direction against the bias of said spring and having a free sliding relation with said casing, and latching means on the exterior of said pad for locking said operating member and said second contact in each of a plurality of controlling positions against the force of said spring.

4. In a heating pad and the like, a temperature control device for the circuit of said pad comprising a switch in said circuit comprising a pair of cooperating contacts, a bimetallic thermostat bar for operating one of said contacts, the second contact having an inclined surface bearing on said first contact carried by said bar arranged when moved in one direction to decrease the tension in said thermostat bar and eventually to disengage said first contact and when moved in the opposite direction to engage said first contact and increase the tension in said bimetallic bar, a resilient member biasing said second contact in said first named direction, a rod-like member connected to said second contact member projecting from said pad whereby it is accessible to move said contact in said second named direction, means for locking said rod-like member and said second contact carried thereby in each of a plurality of controlling positions and means electrically insulating said rod-like member from said second contact.

5. In a heating pad and the like, a temperature control device comprising a thermostat, a movable contact member cooperating with said thermostat so as to change its position, a resilient member biasing said contact member in one direction, a rod for moving said contact member in another direction against said biasing means, a pivoted locking lever on said rod, and a plurality of spaced rests in which said lever can be moved so as to lock said rod in each of its plurality of controlling positions.

6. In a heating pad and the like, a temperature control device comprising a thermostat, a movable contact member cooperating with said thermostat so as to change its position, a resilient member biasing said contact member in one direction, a rod having one end connected with said contact member for moving said contact member in another direction against said biasing means, a housing receiving the other end of said rod and means for locking said rod in predetermined controlling positions comprising a resilient member in said housing carried by said rod and arranged to bear against an inner wall of said housing, a wedge carried by said rod, spring means biasing said wedge to force said resilient member against said housing and thereby lock said rod and a button accessible on the exterior of said housing arranged by depression thereof to release said wedge.

HANNS SINGER.